United States Patent [19]

McCullough et al.

[11] 4,334,524

[45] Jun. 15, 1982

[54] SOLAR HEATER WITH BONDLESS HONEYCOMB HEAT TRAP

[75] Inventors: Robert W. McCullough, Tarrytown; Thomas A. Hewett, Chappaqua, both of N.Y.

[73] Assignee: Union Carbide Corporation, New York, N.Y.

[21] Appl. No.: 141,475

[22] Filed: Apr. 18, 1980

Related U.S. Application Data

[63] Continuation of Ser. No. 824,105, Aug. 12, 1977, abandoned.

[51] Int. Cl.³ .................................................. F24J 3/02
[52] U.S. Cl. ..................................... 126/449; 126/441; 126/417
[58] Field of Search ............... 126/449, 441, 417, 418, 126/422, 426, 450

[56] References Cited

U.S. PATENT DOCUMENTS

| | | | |
|---|---|---|---|
| 3,875,925 | 4/1975 | Johnston | 126/435 |
| 4,018,211 | 4/1977 | Barr | 126/439 |
| 4,019,496 | 4/1977 | Cummings | 126/449 X |
| 4,034,736 | 7/1977 | Telkes | 126/432 |
| 4,062,352 | 12/1977 | Lesk | 126/445 |
| 4,068,361 | 1/1978 | Root | 126/444 X |

OTHER PUBLICATIONS

Hollands, "Honeycomb Devices in Flat-Plate Solar Collectors", Solar Energy, vol. 9, No. 3, pp. 159-164 (1965).
Chun et al., "Effect of a Mylar Honeycomb Layer on Solar Collector Performance", presented at the 1974 Winter ASME meeting, Paper No. 74-WA/HT-11.
Marshall et al., "Use of Lexan and Kapton Honeycombs to Increase Solar Collector Efficiency", presented at National Heat Transfer Conference, Aug. 8-11, 1976.
Baldwin et al., "Performance of Transparent Glass Honeycombs in Flat Plate Collectors", School of Engineering and Applied Science, University of California, Los Angeles, California.
Buchberg et al., "Design Considerations for Solar Collectors with Glass Cylindrical Cellular Covers", University of California, Los Angeles, California.

*Primary Examiner*—Larry Jones
*Attorney, Agent, or Firm*—Gary L. Wamer

[57] ABSTRACT

A solar heater including a housing having a transparent front wall for passing incident solar radiation, a radiation absorbent collector element positioned in the housing and arranged to accept incident solar radiation passing through the front wall, means for passing a fluid medium to be heated through the housing in heat transfer relationship with the collector element and a transparent heat trap disposed in the housing between the collector element and the front wall. The heat trap is made from a cellular structure containing a multiplicity of adjacent cells having walls which are integrally formed with the walls of other cells in one continuous piece from a thermoformable material. The thermoformable material used for the heat trap may be glass or a clear plastic composition which is opaque to infrared radiation emitted from the collector element.

13 Claims, 12 Drawing Figures

U.S. Patent Jun. 15, 1982 Sheet 1 of 3 4,334,524
FIG. 1
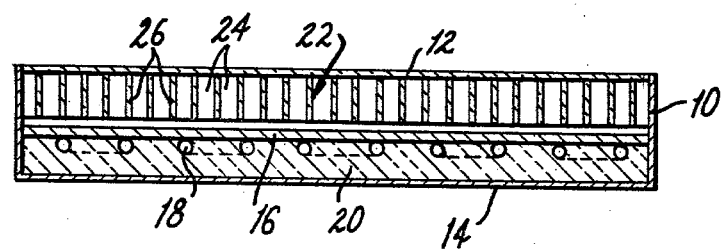
FIG. 2
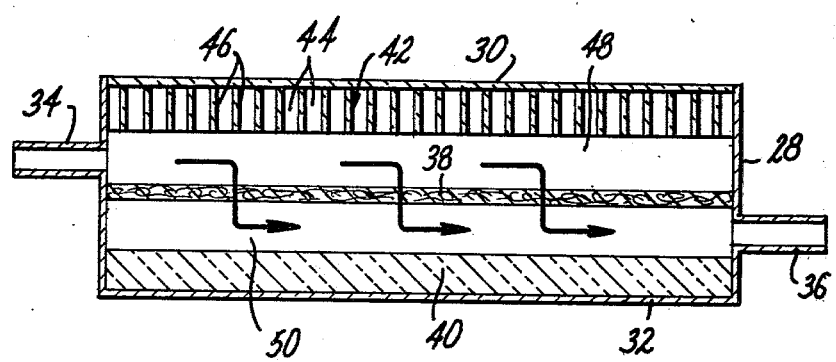
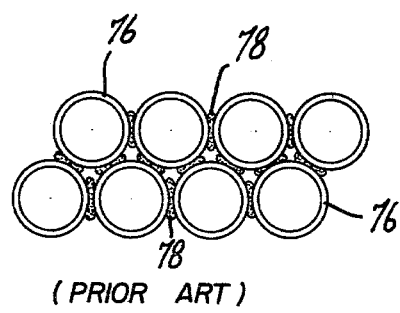
FIG. 7
(PRIOR ART)

SOLAR HEATER WITH BONDLESS HONEYCOMB HEAT TRAP

This application is a continuation of our prior U.S. application Ser. No. 824,105 filed on Aug. 12, 1977, now abandoned.

BACKGROUND OF THE INVENTION (1) Field of the Invention

The present invention relates broadly to solar heaters which convert solar radiation into heat energy and transfer the absorbed heat either to a gas such as air or a liquid such as water, the former type being commonly referred to as a solar air heater and the latter being commonly referred to as a solar water heater. More particularly, the present invention relates to solar heaters of either type which employ a heat trap between the absorber and the light-transmitting front wall.

(2) Description of the Prior Art

Various proposals have already been made in the prior art for employing a heat trap between the absorber and front wall of either a flat plate solar heater or a transpiration solar air heater. Thus, Hollands discloses the use of a transparent honeycomb heat trap in a flat plate solar heater in an article entitled, "Honeycomb Devices in Flat Plate Solar Collectors, " Solar Energy, Vol. 9, pp. 159-169, Pergamon Press (1965). The transparent honeycomb heat trap, in this instance, serves to suppress the onset of natural convection currents and additionally reduces heat losses by radiation.

It has been further discovered that a transparent honeycomb heat trap significantly increases the overall efficiency of a transpiration solar air heater when interposed between the porous absorber and front wall as disclosed and claimed in our copending application Ser. No. 824,100 now U.S. Pat. No. 4,262,657, filed on even date herewith and assigned to the common assignee hereof, and which is a continuation-in-part of our earlier application Ser. No. 712,139 filed on Aug. 6, 1976, now abandoned. As further disclosed and claimed in our copending application, it has been found that the honeycomb heat trap, when placed in at least firm mechanical contact with the front wall, serves the additional function of providing an air buffer layer without the interposition of additional surfaces from which incident sunlight can be reflected away from the absorber and be lost.

Transparent cellular structures such as clear plastic or glass honeycombs, which are now contemplated for use as heat traps in the solar heaters described above, have been made by methods well known in the prior art. In one method that has been used heretofore, clear plastic or glass tubes are stacked and bonded together by a suitable adhesive or solvent. In another method, a multiplicity of elongated narrow strips of plastic film are first coated with an adhesive at spaced apart intervals and then adhered together. This is followed by expansion into a hexagonal honeycomb structure. The use of such bonded expanded honeycomb in a flat plate solar heater has been described in an article entitled, "Effect of a Mylar Honeycomb Layer on Solar Collector Performance," by Chun and Crandall presented at the 1974 Winter Annual Meeting of the ASME (Paper No. 74-WA/HT-11).

A disadvantage common to all honeycomb structures fabricated by the above described and other similar techniques is the presence of adhesive bonds between adjacent cells. These adhesive bonds give rise to certain problems when the honeycomb is used as a heat trap in a solar heater. One such problem is that the adhesive bonds act as scattering sites for incident light and thus reduce the overall transmission of solar rays through the honeycomb at all sun angles different from normal incidence. Thus, at all times different from solar noon, the fraction of incident sunlight which reaches the solar absorbing surface in the solar heater is reduced, with a consequent reduction in conversion efficiency. Another problem which can be associated with the use of any adhesive is that the adhesive will age with attendant cracking, embrittlement and discoloration. Furthermore, fabrication of clear plastic or glass honeycombs using an adhesive is complicated by the fact that adhesives require special handling and thus make the fabrication process time-consuming and expensive.

SUMMARY OF THE INVENTION

The present invention is directed to a novel and improved solar heater which may be either a flat plate solar heater or a transpiration solar air heater and which overcomes the above enumerated problems of the prior art. The solar heater of the present invention includes a housing having a light-transmitting front wall and a radiation absorbent collector element arranged to accept incident solar radiation passing through the front wall. The solar heater further includes a heat trap which is constructed at least in part from an open cellular structure made in one piece from a thermoformable material. Specifically, the open cellular structure from which the heat trap is constructed is composed of a multiplicity of adjacent cells each having walls which are common to other cells in the structure and which walls are integrally formed with the walls of other cells in one continuous piece. The heat trap thus formed has no adhesive bonds joining the walls of adjacent cells and consequently has a high transmission of solar rays compared to bonded honeycombs of the prior art. Furthermore, the heat trap is not subject to deterioration due to the aging of an adhesive. As shall be described in greater detail hereinafter, the open cellular structure can be readily made from the product of an expanded core process or by injection molding.

It is the principal object of the present invention to provide a solar heater having a heat trap characterized by a high transmission of incident sunlight as compared to heat traps of the prior art.

Another object of the present invention is to provide a solar heater having a heat trap which is formed in whole or in part by a cellular structure composed of a multiplicity of cells having common walls which are integrally formed as one piece without adhesive bonds.

Still another object of the present invention is to provide a heat trap for a solar heater which contains no adhesives and which is consequently easy and economical to manufacture.

DESCRIPTION OF THE DRAWING

The present invention will now be described in greater detail hereinafter with particular reference to the accompanying drawing which shows the preferred embodiments thereof and wherein:

FIG. 1 is an elevational schematic, cross-sectional view of a typical flat plate solar heater made in accordance with the present invention;

FIG. 2 is a similar view showing a typical transpiration solar air heater also made in accordance with the present invention;

FIG. 7 is a similar view of another type of honeycomb structure fabricated from tubes bonded by techniques of the prior art;

DESCRIPTION OF THE PREFERRED EMBODIMENTS

Figure 3:
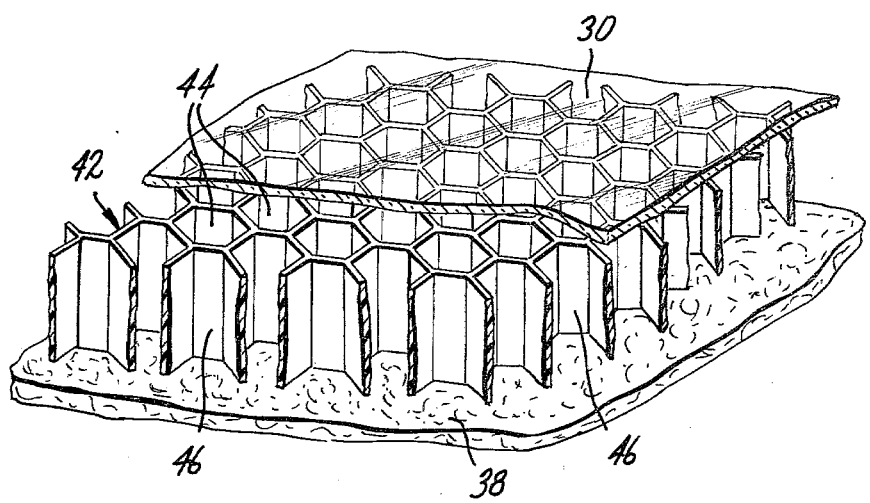
FIG. 3 is an enlarged perspective view of a part of the transpiration solar air heater shown in FIG. 2.

It will be understood that the principles of the present invention are applicable to both a flat plate solar heater and a transpiration solar air heater, although the heat trap performs somewhat different functions in each type of solar heater. For purposes of convenience, the principles of the present invention will be disclosed independently with respect to each type of solar heater in the following description.

Referring now specifically to FIG. 1 of the drawing, there is shown a flat plate solar heater embodying the present invention. The solar heater comprises a housing 10 having a light-transmitting front wall 12 which passes incident solar radiation and a back wall 14. The front wall 12 is preferably made from a clear or transparent material having a relatively low reflectivity and which is non-porous and gas impermeable, e.g., clear plastic or glass. A flat radiation absorbent collector plate 16 is mounted within the housing 10 in spaced apart relation to the front wall 12 and back wall 14. The collector plate 16 is arranged in the housing 10 so as to intercept solar rays transmitted through the front wall 12. A tubular coil 18 or other passage means for a fluid such as air or water is provided in contact with the flat collector plate 16. Preferably, the coil 18 is located in the space below the collector plate 16 as shown. The remaining space between the flat collector plate 16 and the back wall 14 may be filled with a suitable insulation, e.g., glass wool, as denoted by the reference numeral 20. The housing 10 may suitably be made of a rigid metal such as aluminum or steel or other rigid material such as plastic or fiberglass.

The housing 10 further includes a heat trap 22 which is positioned just beneath the front wall and which is made from a cellular structure such as transparent honeycomb constructed in one piece in accordance with the present invention. More specifically, the heat trap is composed of a multiplicity of cells 24 having cell walls 26 which are substantially perpendicular to the front wall 12.

During operation of the solar heater, incident solar rays pass through the front wall 12 and the heat trap 22 and are absorbed by the flat collector plate 16 where they are converted to heat. This heat, in turn, is transferred by conduction and convection to a fluid such as air or water which is circulated through the coil 18 in contact with the collector plate 16.

In this embodiment of the present invention, the heat trap 22 serves the dual function of reducing the radiative heat loss from the solar heater and of suppressing the onset of natural convection in the air space between the flat collector plate 16 and the front wall 12. In order for the heat trap to effectively reduce heat loss by radiation the cells 24 must be of sufficiently high aspect ratio as described in detail in our copending application Ser. No. 824,100 supra, i.e., in the range of 2 to 10 for honeycomb cellular structures. As shown in FIG. 1, the cell walls 26 divide up the air space between the flat collector plate 16 and the front wall 12 and inhibit the development of natural convection currents. To allow for differential thermal expansion of the solar heater elements, a gap may be provided either above or below the heat trap.

FIG. 2 shows a transpiration solar air heater embodying the present invention. As shown, the transpiration solar air heater comprises a housing 28 having a transparent front wall 30, e.g., clear plastic or glass, and a back wall 32. The housing 28 further includes an inlet 34 in one side wall and an outlet 36 in the opposite side wall. The inlet 34 and outlet 36 establish a flow path through the housing 28 for a gas such as air to be heated as generally indicated by the arrows in the drawing. A porous, radiation absorbent collector plate 38 is mounted inside the housing 28 in spaced apart parallel relation to the front wall 30 and the back wall 32 and across the flow path established between the inlet 34 and the outlet 36. The porous collector plate 38 may be composed, for example, of a porous darkened or black fibrous mat, woven or stamped screens, or reticulated foam. Although the porous collector plate 38 is shown in spaced parallel relation to the back wall, it will be understood that the collector plate may be positioned in non-parallel relation to the back wall as disclosed and claimed in our copending application Ser. No. 824,100 supra. If desired, a layer of insulation 40 may be placed adjacent to the back wall 32 and in spaced apart relation to the porous collector plate 38. Again, the housing 28 may be made of rigid metal such as aluminum or steel or other rigid materials such as plastic or fiberglass.

In accordance with the present invention, a heat trap 42 is positioned just beneath the front wall 30. The heat trap is made from a cellular structure such as honeycomb which is also constructed in one piece as shall be described in greater detail hereinafter. The heat trap in this embodiment is basically the same construction as that shown in FIG. 1 having cells 44 defined by cell walls 46 which are positioned substantially perpendicular to the front wall 30. In this instance, however, the assembly of the heat trap 42 in the housing 28 is such as to provide an enlarged space 48. This space 48 provides a passage for the gas such as air to be heated between the lower surface of the heat trap and the porous collector plate 38.

The operation of the transpiration solar air heater is similar in that incident solar rays pass through the transparent front wall 30 and the heat trap 42 and are absorbed by the porous collector plate 38 and converted to heat. However, in this instance, the gas or air to be heated enters the inlet 34 and follows the flow path indicated by the arrows in the drawing. The gas or air then passes or transpires through the entire porous collector plate 38 and is heated. The heated gas or air then exits via the space 50 below the porous collector plate 38 and through the outlet 36. It should be noted that in this embodiment, the heat trap 42 serves the dual function of reducing the radiative heat loss from the solar heater and of providing an air buffer layer composed of baffles which prevent the forced convective flow of the gas or air to be heated adjacent to the front wall where heat losses may occur. As disclosed and claimed in our copending application Ser. No. 824,100 supra, the heat trap is preferably maintained in at least firm mechanical contact with and may actually be bonded to the front wall 30 in order to improve its effect as an air buffer. With this specific structure it is not necessary to employ an additional gas impermeable layer to prevent the flow of gas through the honeycomb and into contact with the front wall. The aspect ratio of the heat trap in this instance is basically the same as that described above, that is, in a range of between about 2 and 10 for honeycomb cellular structures.

Although the heat trap has been shown in FIG. 2 as being just beneath the front wall 30 of the transpiration solar air heater where it functions as an air buffer and radiation trap, it will be understood that the present invention is not restricted to this location of the heat trap. Thus, as disclosed and claimed in our copending application Ser. No. 824,100 supra, which is incorporated herein by reference, it may also be advantageous to position the heat trap on top of the porous collector plate or to locate the heat trap in a position intermediate the collector plate and front wall.

FIG. 3 shows in greater detail the heat trap 42 used in the transpiration solar air heater of FIG. 2. Although the heat trap may be made from a variety of cellular structures, it is preferred to employ a hexagonal honeycomb configuration as shown in the drawing. As shown, the honeycomb structure is composed of a multiplicity of hexagonal cells 44 which are arranged adjacent to one another and are defined by the walls 46 which are common to other cells in the structure and which walls are integrally formed with walls of other cells in one continuous piece. It may be noted that the cell walls 46 are oriented substantially perpendicular to the plane of the front wall. As already indicated, the heat trap used in the flat plate solar heater of FIG. 1 may be of basically the same hexagonal construction.

The heat trap may be made in one piece from the products of conventional forming or molding techniques as shall be described hereinafter in greater detail. Suitably, the heat trap may be made from glass or clear plastic compositions such as polyvinyl fluoride, polycarbonate, fluorinated ethylene propylene, polymethyl methacrylate, aromatic polysulfones, polyethylene terephthalate, aromatic polyesters, polyvinylidene fluoride, hexafluoropropylene, chlorotrifluoroethylene and tetrafluoroethylene copolymers.

In the embodiments of the present invention shown schematically in FIGS. 1-3, the heat traps are shown with cells having relatively thick walls for purposes of illustration. It will, however, be understood that in order to effectively function as heat traps the cell walls must be made relatively thin, i.e., in the range of 0.0002 and 0.05 centimeters.

The heat trap can be made by conventional forming or molding techniques well known in the art. For instance, heat traps can most advantageously be made from articles made by the expanded core process disclosed and claimed in U.S. Pat. No. 3,919,446 issued to W. H. Smarook on Nov. 11, 1975, and assigned to the common assignee hereof. Variations and improvements of this process and apparatus for carrying out the process are disclosed in the following patents: U.S. Pat. Nos. 3,765,810, 3,919,379, 3,919,380 and 3,919,445.

Figure 4A:
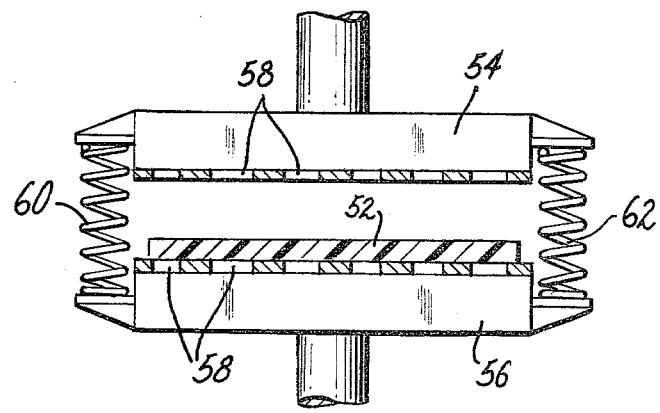
FIGS. 4a–4c are elevational, schematic, cross-sectional views of the platens used in the expanded core process for forming articles from which heat traps of the present invention can be made, the platens being shown in their relative positions during different stages of the process.
Figure 4B:
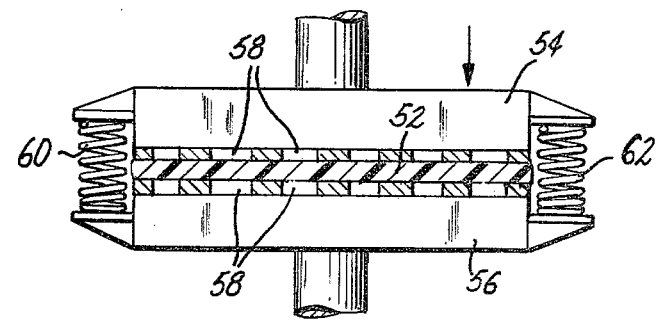
Figure 4C:
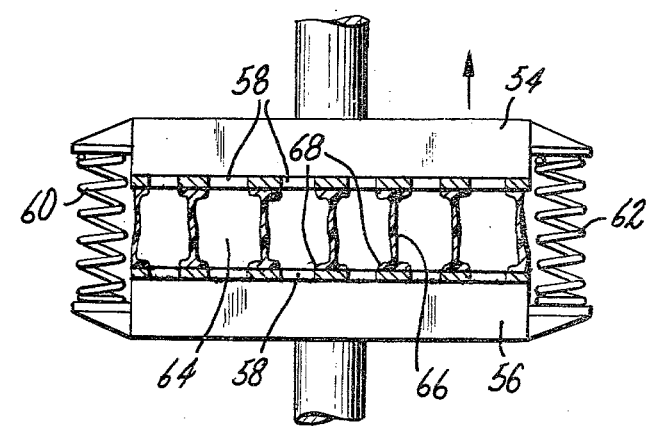

FIGS. 4a-4c show different stages of the expanded core process. In the first stage of the process, a blank 52 of thermoformable material is placed between two heated platens 54, 56 provided with a pattern of vent holes 58 as shown in FIG. 4a. In the next stage the heated platens 54, 56 are brought into contact with the blank 52 as depicted in FIG. 4b. The platens are then allowed to separate under the force of the compressed bias springs 60, 62 expanding the cross-section of the of the blank 52 in a manner whereby voids such as cells 64 of hexagonal shape, for example, are formed from the surfaces of the blank. As shown in FIG. 4c the cellular structure thus formed is made in one continuous piece with cell walls 66 common to adjacent cells 64. These walls are integral with other cell walls in the cellular structure as more particularly shown in the perspective view of FIG. 3. Ordinarily, articles formed by this process include a perforated skin on one or both sides such as shown at 68 in FIG. 4c. The skin or skins must be removed before the article is suitable for use as a heat trap. The perforated skins, if not removed, would be oriented such that incident solar rays reflected from them would be directed away from the solar absorber and be lost. The perforated skins may be removed by passing an electrically heated wire through the cell walls immediately adjacent to the skins or by use of a reverse-cutting, knife-edge band saw blade such as that used for the cutting of metallic honeycombs. For a better understanding of the process, reference should be made to the specifications of the aforementioned U.S. patents to W. H. Smarook. It will be further understood, of course, that the heat trap can be formed by other processes such as injection molding wherein thermoformable material is injected under pressure into a mold having the desired cellular configuration.

Figure 5:
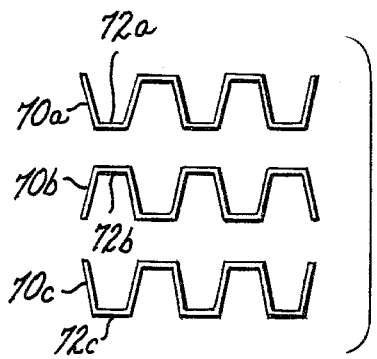
FIG. 5 is a top plan view showing individual film strips before bonding into a honeycomb structure according to methods of the prior art.
Figure 6:
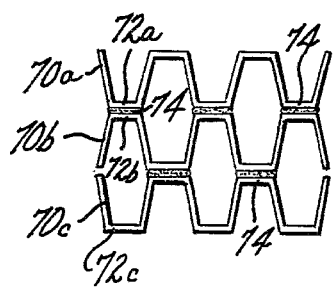
FIG. 6 is a similar view of the honeycomb structure which is made by bonding the film strips shown in FIG. 5.

As indicated above, heat traps for use in solar heaters of the prior art have been made using a bonded expanded honeycomb. Such honeycomb structures can be made by the bonding technique illustrated in FIGS. 5 and 6. In this technique a multiplicity of strips of plastic film, as shown at 70a, 70b and 70c, are crimped or otherwise shaped into corrugations and placed adjacent to one another with the flat surfaces 72a, 72b and 72c aligned. A suitable adhesive is then applied to at least one of the flat surfaces and the surfaces are adhered to one another to form an hexagonal honeycomb as shown in FIG. 6. The aligned surfaces 72a, 72b and 72c when adhered together form a multiplicity of cemented joints as at 74 throughout the honeycomb structure.

A similar honeycomb structure for use in solar heaters can be made from a multiplicity of transparent tubes 76 as shown in FIG. 7. The tubes 76 are placed in like manner adjacent to one another and then coated with an adhesive along their longitudinal surfaces. The tubes 76 are then adhered together through a multiplicity of bonded joints 78.

Figures 8, 9:
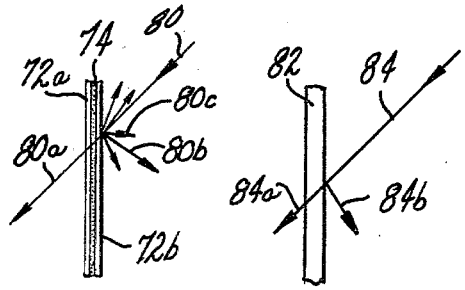
FIG. 8 is a schematic view showing a typical solar ray incident on a bonded honeycomb cell wall and the resulting pattern of transmitted, reflected and scattered rays.
FIG. 9 is a schematic view showing a typical solar ray incident on a honeycomb cell wall of the present invention and the resulting pattern of transmitted and reflected rays.

Any type of bonded honeycomb such as those described above suffers from the disadvantage that the bonded joints act as scattering sites for incident light. FIG. 8 shows a typical solar ray incident on a bonded honeycomb cell wall and the resulting pattern of transmitted, reflected and scattered rays. The incident ray 80 is partly transmitted as at 80a and partly reflected as at 80b. Part of the incident ray 80 is also scattered into a multiplicity of diffuse rays as indicated at 80c. The diffuse rays 80c result from the scattering of light at the adhesive bonds 74 of the bonded expanded honeycomb shown for example in FIG. 6. Similar scattering of incident solar rays occurs at the bonded joints 78 of the tubular honeycomb shown in FIG. 7. It will thus be seen that the presence of adhesive bonds in honeycomb structures can significantly reduce the overall transmission of solar rays through the honeycomb. This reduction in light transmission will occur at all sun angles different from normal incidence, resulting in reduced conversion efficiencies at all times different from solar noon.

FIG. 9 shows a typical solar ray incident on a cell wall of a honeycomb structure used as a heat trap in accordance with the present invention. It will be noted that the honeycomb in this case is constructed in one continuous piece with integrally formed cell walls as depicted at 82 and that therefore there are no bonded joints to act as scattering sites for incident light. The incident ray 84 is partly transmitted as at 84a and partly reflected as at 84b. Since there are no scattering sites in the honeycomb cell walls, there are no scattered diffuse rays as depicted in the view of FIG. 8. It will be further noted that regardless of the type of honeycomb used, the transmitted and reflected rays continue in a direction through the heat trap while, on the other hand, at least part of the scattered rays are in directions out of the heat trap and away from the absorber where they are lost.

A series of experiments were conducted to compare the overall solar transmission of honeycomb heat traps of the present invention with that exhibited by bonded honeycomb traps of the prior art. Two types of bonded honeycomb structures were compared in the experiments. One type consisted of bonded expanded strip honeycomb substantially as shown in FIG. 6. This honeycomb was made of clear Mylar (Dupont) and had hexagonal cells with a length of 2.0 inches and an effective diameter of 0.375 inches. The other type of bonded honeycomb used in the experiment was made from tubes bonded together in the manner shown in FIG. 7. This bonded honeycomb was made of clear polycarbonate and had circular cells with a length of 2.0 inches and a diameter of 0.1875 inches. The heat traps constructed in accordance with the present invention were made from honeycombs produced by the expanded core process described hereinabove. The honeycombs were made in one continuous piece of polycarbonate and had hexagonal cells with a length of 1.0 inch and an effective diameter of 0.250 inches. The exact composition of the adhesive used in fabricating the bonded expanded strip or bonded tube honeycombs was not known.

The experiments were conducted in the following manner: Two calibrated pyranometers were mounted on the same flat surface which could be moved to change its orientation with respect to the sun. The honeycomb to be tested was then mounted in a plane parallel to the flat surface and over one of the pyranometers. The radiation flux incident on each pyranometer was then measured for solar incidence angles of between about 0 and 50 degrees, and the ratio of the flux under the honeycomb to that measured with no honeycomb was determined. This ratio represents the overall solar transmittance of the honeycomb.

Figure 10:
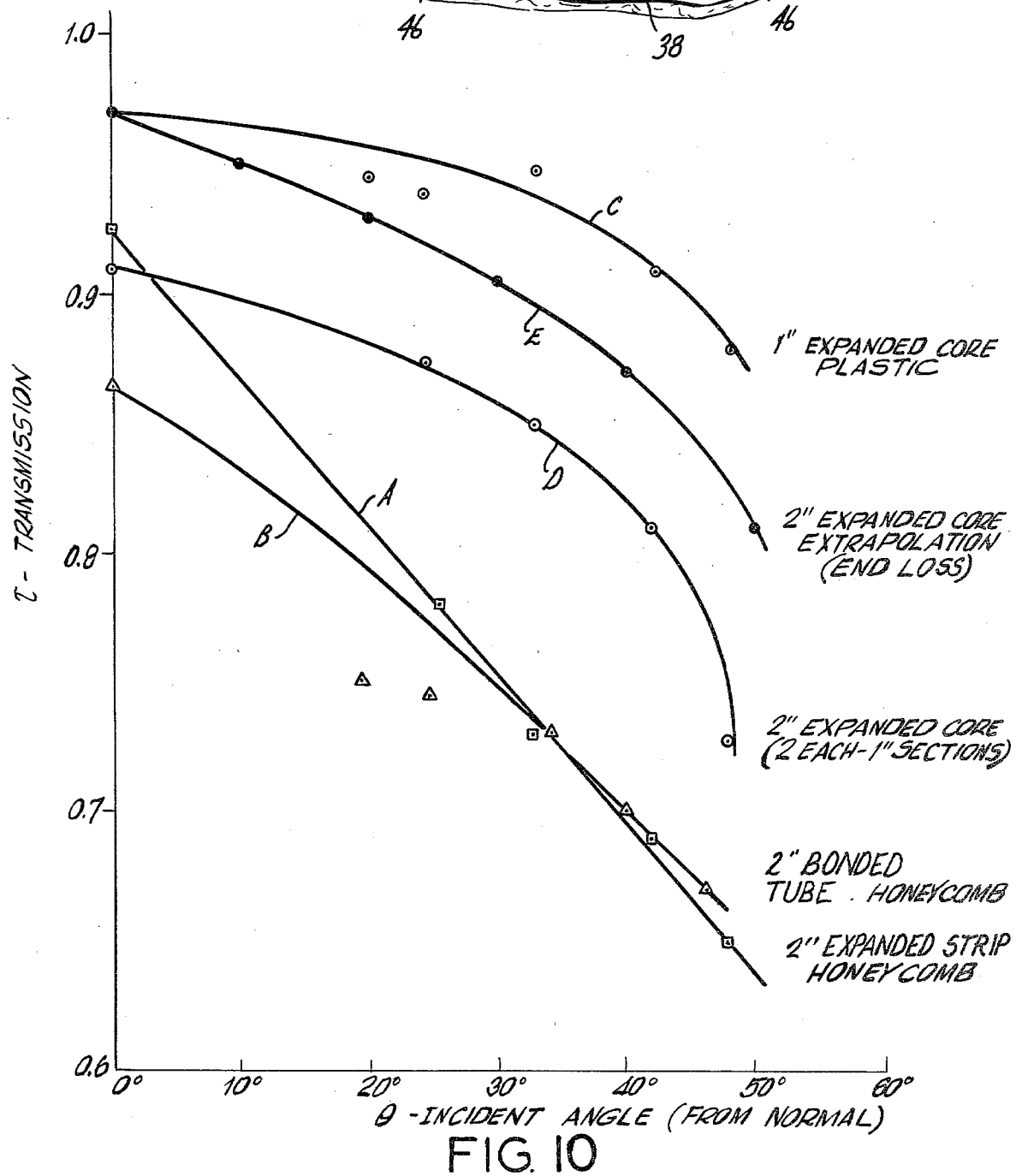
FIG. 10 is a graph showing the relationship between the angle of incidence and the solar transmission of several heat traps.

FIG. 10 shows the results of these experiments. It will be noted from curve A of the graph that the 2.0 inch bonded expanded strip honeycomb exhibits a rapid decrease in overall solar transmittance with increasing angle of incidence, beginning at a value above 0.90 for normal incidence and dropping to a value below 0.70 for an incident angle of 50 degrees. This range of incident sun angles corresponds to periods of solar heater operation approximately three hours before and after solar noon for solar heaters oriented to face the sun at solar noon. The transmission of the 2.0 inch bonded tube honeycomb, shown as curve B in the graph, exhibits a similar dependence on incident angle, having a value greater than 0.85 at normal incidence and dropping to a value below 0.70 for an incident angle of about 50 degrees. In comparison thereto, the 1.0 inch integrally formed honeycomb exhibits a high transmission over a wide range of incident angles, as indicated by curve C in the graph. Since 2.0 inch expanded core honeycomb was not available at the time of the experiments for comparison with the 2.0 inch bonded honeycombs, a hybrid 2.0 inch expanded core honeycomb was constructed. This hybrid honeycomb was made by stacking two 1.0 inch honeycombs over the test pyranometer. It was determined beforehand, however, that this hybrid honeycomb would not exhibit the same performance as a 2.0 inch expanded core honeycomb due to the presence of additional light scattering sites at the upper end of the lower honeycomb. Test data was taken on this hybrid honeycomb and is shown as curve D in the graph of FIG. 10. The anticipated results for a single piece 2.0 inch expanded core honeycomb may be extrapolated from the above results by dividing out the end losses for the second honeycomb as shown by curve E. It may be noted that the transmission of light in the case of the extrapolated results for the 2.0 inch expanded core honeycomb begins at the same high value as the 1.0 inch expanded core honeycomb at normal incidence. The transmission of light for the extrapolated results falls somewhat more rapidly with increasing incident angle, but remains above 0.80 for incident angles up to about 50 degrees. This more rapid decrease in transmission is due to the additional thickness of the honeycomb which is desirable for its effective use as a heat trap. It will be further noted that even in the case of the 2.0 inch stacked hybrid honeycomb with additional end losses, the overall transmission of light is still far superior to either of the bonded honeycomb structures of the prior art.

It should be noted that the heat trap has been shown in the drawing with walls perpendicular to the plane of the front wall. The present invention, however, is not so restricted, and the cell walls may be disposed at angles other than perpendicular so long as any solar rays reflected from the cell walls are not directed back toward the front wall during normal periods of operation. Thus, the term "substantially perpendiuclar to the front wall," as used herein and in the appended claims is intended to include such other angles with reference to the orientation of cell walls. It has been determined that the cell walls may be disposed at angles with respect to the perpendicular of up to about 22.5 degrees without incident solar rays being reflected away from the solar absorber when the normal period of operation is taken to be about three hours before and after solar noon. For a more detailed explanation of the cell wall angle and how it is derived, reference is made to our copending application Ser. No. 824,100 which is incorporated herein by reference.

The present invention is likewise not restricted to the construction of heat traps which are made entirely in one piece. In fact, the heat traps may be constructed from two or more of the integral cellular structures, suitably joined together, for example, by an adhesive. This adhesive would be the only adhesive used throughout the entire heat trap assembly.

The heat trap of the present invention may also be made with a transparent front wall or glazing formed integrally therewith as described and claimed in our copending application Ser. No. 824,100 filed on even date herewith and assigned to the common assignee hereof.

From the foregoing it will be readily seen that the present invention provides a solar heater having a heat trap characterized by a high transmission of incident sunlight as compared to heat traps of the prior art. Specifically, the present invention provides a heat trap for a solar heater which is made from a cellular structure composed of a multiplicity of cells having common walls which are integrally formed in one piece from the same clear or transparent thermoformable material. The heat trap made in accordance with the present invention does not contain any adhesive bonds or joints, except those necessary to join large sections of the integral cellular structure, which joints can act as sites for scattering of incident sunlight and which can discolor or otherwise deteriorate with age.

What is claimed is:

1. In a solar air heater comprising in combination:
   a housing having a light-transmitting front wall for passing incident solar radiation and including an inlet and an outlet for establishing a flow path for a gaseous medium to be heated,
   a gas permeable radiation absorbent collector element positioned across the flow paths in said housing and arranged to accept incident solar radiation passing through said front wall and to transfer the absorbed heat to said gaseous medium passing along said flow path through said collector element, and
   a heat trap disposed in said housing adjacent to the surface of said front wall facing said collector element, said heat trap comprising a cellular honeycomb structure containing a multiplicity of open cells in communication with said flow path and having cell walls that are substantially perpendicular to said front wall and which serve as baffle elements to inhibit the flow of said gaseous medium through said heat trap in a direction substantially parallel to the plane of said front wall, said cellular structure being maintained in at least firm mechanical contact with said front wall and being composed of a light-transmitting material which is opaque to infrared radiation emitted from said collector element in a direction toward said front wall, such that said heat trap is integrally formed as a unitary member thereby eliminating interfacial surfaces, joints or adhesive bonds therebetween which can act as scattering sites for incidental light.

2. A solar heater according to claim 1 wherein said thermoformable material is glass or a clear plastic composition selected from the group consisting of polyvinyl fluoride, polycarbonate, fluorinated ethylene propylene, polymethyl methacrylate, aromatic polysulfones, polyethylene terephthalate, aromatic polyesters, polyvinylidene fluoride, hexafluoropropylene, chlorotrifluoroethylene and tetrafluoroethylene copolymers.

3. A solar heater according to claim 1 wherein said transparent honeycomb is composed of a multiplicity of cells having a hexagonal cross-section.

4. A solar heater according to claim 1 wherein said transparent honeycomb is composed of a multiplicity of cells having a length to diameter ratio of between about 2 and 10.

5. A solar heater according to claim 1 wherein said transparent honeycomb is composed of a multiplicty of cells having walls of a thickness within the range of from about 0.0002 to about 0.05 centimeters.

6. A solar heater according to claim 1 wherein said heat trap is bonded to said front wall.

7. A solar heater according to claim 1 wherein said heat trap is integrally formed with said front wall.

8. A solar heater according to claim 1 wherein said radiation absorbent collector element is positioned in substantially parallel, spaced apart relation to said front wall.

9. A solar heater according to claim 1 wherein said radiation absorbent collector element is positioned in non-parallel relation to said front wall.

10. A solar heater according to claim 1 wherein said radiation absorbent collector element comprises a porous opaque mat made from a material selected from the group consisting of pressed fibers woven screen, stamped screen and reticulated foam.

11. A solar heater according to claim 1 wherein said housing includes a bottom wall and opposite side walls which are made of metal.

12. A solar heater according to claim 1 wherein a layer of insulation is provided adjacent to said bottom wall.

13. A solar heater according to claim 1 wherein said housing includes a bottom wall and opposite side walls which are made of a rigid insulating material.

* * * * *